US008649568B2

(12) United States Patent
Sato

(10) Patent No.: US 8,649,568 B2
(45) Date of Patent: Feb. 11, 2014

(54) VEIN AUTHENTICATION APPARATUS, IMAGING APPARATUS FOR VEIN AUTHENTICATION, AND VEIN ILLUMINATING METHOD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 646 days.

(21) Appl. No.: 12/668,973

(22) PCT Filed: Jul. 17, 2008

(86) PCT No.: PCT/JP2008/063333
§ 371 (c)(1),
(2), (4) Date: Jan. 13, 2010

(87) PCT Pub. No.: WO2009/014194
PCT Pub. Date: Jan. 29, 2009

(65) Prior Publication Data
US 2010/0208949 A1 Aug. 19, 2010

(30) Foreign Application Priority Data
Jul. 20, 2007 (JP) .................................. 2007-189869

(51) Int. Cl.
*G06K 9/00* (2006.01)
*G06F 7/04* (2006.01)

(52) U.S. Cl.
USPC .......... 382/115; 382/124; 382/195; 340/5.53; 340/5.83; 713/176

(58) Field of Classification Search
USPC ......... 382/100, 115–118, 124, 162, 165, 181, 382/190, 195, 199, 203, 209, 289, 312; 340/5.51–5.54, 5.82–5.84; 600/476; 713/176; 348/156
See application file for complete search history.

(56) References Cited

U.S. PATENT DOCUMENTS 7,184,576 B2 * 2/2007 Kono et al. ................... 382/115
7,415,139 B2 8/2008 Takiguchi
(Continued)

FOREIGN PATENT DOCUMENTS

JP 2003-331270 11/2003
JP 2005-71317 3/2005
(Continued)

OTHER PUBLICATIONS

Nadort et al. "The Hand Vein Pattern Used as a Biometric Feature" Master Literature Thesis Univ. of Amsterdam (May 2007) pp. 1-179.*

(Continued)

*Primary Examiner* — Chan S Park
*Assistant Examiner* — Mia M Thomas
(74) *Attorney, Agent, or Firm* — Finnegan, Henderson, Farabow, Garrett & Dunner, L.L.P.

(57) ABSTRACT

A vein authentication apparatus is disclosed. The apparatus may include an imaging unit having a plurality of imaging sections. Each imaging section may be configured to image light reflected from a vein plexus inside a finger and light transmitted through the vein plexus. The apparatus may also include an illumination source located on the same side as the imaging unit with respect to the vein plexus and configured to emit near-infrared light. The apparatus may further include a controller. The controller may be configured to perform authentication processing on the basis of an image imaged by the imaging unit and vein information previously stored. The controller may also be configured to control the illumination source such that the near-infrared light emitted from the illumination source is scattered behind a vein section corresponding to an imaging section being in an imaging period among the plurality of imaging sections.

12 Claims, 8 Drawing Sheets

(56) References Cited

U.S. PATENT DOCUMENTS

| | | | |
|---|---|---|---|
| 7,580,552 B2* | 8/2009 | Yoshizu et al. | 382/115 |
| 7,680,305 B2* | 3/2010 | Miura et al. | 382/115 |
| 7,869,624 B2* | 1/2011 | Takiguchi | 382/115 |
| 8,098,900 B2* | 1/2012 | Determan et al. | 382/115 |
| 8,107,706 B2* | 1/2012 | Saijo | 382/128 |
| 8,280,118 B2* | 10/2012 | Ueki et al. | 382/115 |
| 8,320,998 B2* | 11/2012 | Sato | 600/474 |
| 2006/0083411 A1* | 4/2006 | Benkley, III | 382/124 |
| 2007/0003112 A1* | 1/2007 | Awatsu et al. | 382/115 |
| 2007/0057764 A1* | 3/2007 | Sato et al. | 340/5.52 |
| 2007/0116330 A1* | 5/2007 | Takiguchi | 382/115 |
| 2007/0177767 A1* | 8/2007 | Miura et al. | 382/115 |
| 2007/0177769 A1* | 8/2007 | Motoyama et al. | 382/115 |
| 2007/0201727 A1* | 8/2007 | Birrell et al. | 382/115 |
| 2007/0230753 A1* | 10/2007 | Kitane et al. | 382/124 |
| 2008/0075331 A1* | 3/2008 | Sakurai et al. | 382/115 |
| 2008/0112600 A1* | 5/2008 | Miura et al. | 382/125 |
| 2008/0118114 A1* | 5/2008 | Takiguchi | 382/124 |
| 2008/0211628 A1* | 9/2008 | Hashimoto et al. | 340/5.83 |
| 2009/0080718 A1* | 3/2009 | Abe | 382/125 |
| 2009/0174662 A1* | 7/2009 | Kato | 345/163 |
| 2009/0214083 A1* | 8/2009 | Sato | 382/107 |
| 2010/0008545 A1* | 1/2010 | Ueki et al. | 382/115 |
| 2010/0026453 A1* | 2/2010 | Yamamoto et al. | 340/5.83 |
| 2010/0208948 A1* | 8/2010 | Abe | 382/115 |
| 2011/0063077 A1* | 3/2011 | Jung et al. | 340/5.83 |
| 2011/0188711 A1* | 8/2011 | Miura et al. | 382/115 |
| 2011/0216941 A1* | 9/2011 | Saijo | 382/103 |
| 2012/0148143 A1* | 6/2012 | Takiguchi | 382/134 |
| 2013/0200995 A1* | 8/2013 | Muramatsu et al. | 340/5.51 |

FOREIGN PATENT DOCUMENTS

| | | |
|---|---|---|
| WO | WO 03/096272 A1 | 11/2003 |
| WO | WO 2006/026794 A1 | 3/2006 |

OTHER PUBLICATIONS

Xueyan et al. "The Fourth Biometric-Vein Recognition" College of Electronic Science Nov. 2008, pp. 1-10 (pp. 537-546).*

* cited by examiner (A)

EXPLANATION OF REFERENCE

1 ... AUTHENTICATION APPARATUS, 10 ... CONTROL PORTION, 11 ... OPERATING PORTION, 12 ... IMAGING UNIT, 13 ... MEMORY, 14 ... INTERFACE, 15 ... NOTIFICATION PORTION, 21 ... DRIVING PORTION, 22 ... VEIN INFORMATION EXTRACTING PORTION, 23 ... REGISTRATION PORTION, 31 ... AUTHENTICATION PORTION, 41 ... AREA IMAGE SENSOR, 42 ... MICROLENS ARRAY, 43 ... LIGHT SOURCE, 44 ... PRISM

VEIN AUTHENTICATION APPARATUS, IMAGING APPARATUS FOR VEIN AUTHENTICATION, AND VEIN ILLUMINATING METHOD

TECHNICAL FIELD

The present invention relates to a vein authentication apparatus, an imaging apparatus for vein authentication, and a vein illuminating method.

BACKGROUND ART

Authentication technologies utilizing a living body as authentication means are coming into wide use. And, incorporating biometric authentication into a potable communication device, such as a cellular phone, enables authentication processing to be easily performed on a communication party anywhere through the portable communication device, so it is important to incorporate a biometric authentication apparatus into a portable communication device. Reduction in size and increase in density of a portable communication device in recent years are drastic, so size reduction in an incorporated apparatus is an important issue.

Traditionally, there are vein authentication apparatuses utilizing a vein as a target, and one example of such vein authentication apparatuses is a vein authentication apparatus called the transmissive type. For the vein authentication apparatus of this transmissive type, a light illuminating portion and an imaging portion are disposed so as to sandwich a finger containing a vein being an authentication target, and it is illuminated with near-infrared light from behind the vein. Owing to this, a non-vein section is in a light state, whereas a vein section is maintained in a dark state because of absorption properties of hemoglobin. This leads to a sharp contrast between the vein section and the non-vein section, and therefore, a good vein image is obtainable.

However, for the vein authentication apparatus of the transmissive type, the light illuminating portion and the imaging portion are disposed so as to sandwich a finger, and typically, the finger sandwiched between the light illuminating portion and the imaging portion is covered with a blocking portion for blocking light other than imaging light. This may cause problems in which an authentication-target person feels uneasy about the finger being covered and the apparatus has a large size. One example that can solve these problems is a vein authentication apparatus of the reflective scattering type (refer to Patent Document 1).

For the vein authentication apparatus of this reflective scattering type, a light illuminating portion and an imaging portion are disposed on the same direction side with respect to a finger containing a vein being an authentication target, and the finger is not covered with a blocking portion, and it is illuminated with near-infrared light from behind the vein. Owing to this, as compared with a vein authentication apparatus of the transmissive type, ease can be offered to an authentication-target person and size reduction can be achieved. Additionally, owing to the production of scattering light behind a vein plexus being an authentication target, a non-vein section is in a light state, whereas a vein section is maintained in a dark state because of absorption properties of hemoglobin, so a vein image having a good contrast is obtainable.

Patent Document 1: International Publication No. 03-096272

However, in the case where the light illuminating portion and the imaging portion are disposed on the same direction side with respect to the finger being an authentication target, in order to prevent light from entering the gap between a vein plexus being an imaging target and the imaging portion, it is necessary to largely incline near-infrared light to be output toward the vein plexus. Because of this, there is a problem in which the apparatus has a large size.

DISCLOSURE OF INVENTION

The present invention is made in consideration of the above respects and is directed to providing a vein authentication apparatus capable of having a reduced size, an imaging apparatus for vein authentication, and a vein illuminating method.

To solve the above issues, the present invention is a vein authentication apparatus including an imaging portion including a plurality of imaging sections for imaging reflected light reflected from a vein plexus inside a finger and transmitted light transmitted through the vein plexus, the imaging portion being controlled such that the imaging sections perform imaging in different periods, an illuminating portion arranged on the same direction side as the imaging portion with respect to the vein plexus and configured to emit near-infrared light, an authentication processing portion configured to perform authentication processing on the basis of an image imaged by the imaging portion and vein information previously stored, and an illumination control portion configured to control the illuminating portion such that the near-infrared light emitted from the illuminating portion is scattered behind a vein section corresponding to an imaging section being in an imaging period among the plurality of imaging sections.

And, the present invention is an imaging apparatus for vein authentication, the imaging apparatus including an imaging portion including a plurality of imaging sections for imaging reflected light reflected from a vein plexus inside a finger and transmitted light transmitted through the vein plexus, the imaging portion being controlled such that the imaging sections perform imaging in different periods, an illuminating portion arranged on the same direction side as the imaging portion with respect to the vein plexus and configured to emit near-infrared light, and an illumination control portion configured to control the illuminating portion such that the near-infrared light emitted from the illuminating portion is scattered behind a vein section corresponding to an imaging section being in an imaging period among the plurality of imaging sections.

Additionally, the present invention is a vein illuminating method of driving an illuminating portion configured to illuminate a vein plexus inside a finger with near-infrared light, the illuminating portion being arranged on the same direction side as an imaging portion, the vein illuminating method controlling the illuminating portion such that, in the case where a plurality of imaging sections in the imaging portion for imaging reflected light reflected from the vein plexus inside the finger and transmitted light transmitted through the vein plexus perform imaging in different periods, the near-infrared light emitted from the illuminating portion is scattered behind a vein section corresponding to an imaging section being in an imaging period among the plurality of imaging sections.

As described above, with the present invention, because an illuminating portion is controlled such that near-infrared light emitted from the illuminating portion is scattered behind a vein plexus opposite to an imaging section being in an imaging period among a plurality of imaging sections, and thus, the near-infrared light emitted from the illuminating portion can be permitted to enter a gap between an imaging section not being in an imaging period and the vein plexus, sufficient authentication accuracy is obtainable even if the illuminating portion is brought closer to an imaging target. Hence, size reduction can be achieved.

BRIEF DESCRIPTION OF DRAWINGS

FIG. 9 is diagram that presents an explanation of reference numbers used in this disclosure.

BEST MODES FOR CARRYING OUT THE INVENTION

An embodiment in which the present invention is used is described below about the drawings.

(1) General Configuration of Authentication Apparatus

Figure 1:
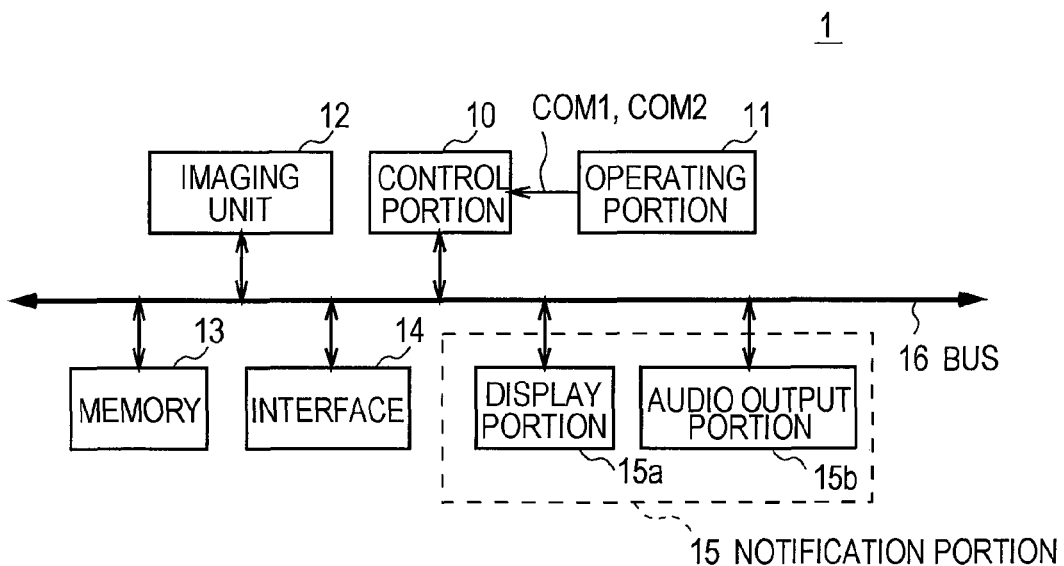
FIG. 1 is a block diagram that illustrates a configuration of an authentication apparatus according to the present embodiment.

FIG. 1 illustrates a general configuration of an authentication apparatus 1 according to the present embodiment. This authentication apparatus 1 is configured such that an operating portion 11, an imaging unit 12, a memory 13, an interface 14, and a notification portion 15 are connected to a control portion 10 through a bus 16.

The control portion 10 is configured as a computer containing a central processing unit (CPU) controlling the whole of the authentication apparatus 1, a read-only memory (ROM) in which various programs and setting information are stored, and a random-access memory (RAM) serving as a work memory of the CPU.

In response to a user operation, a command COM1 for a mode for registering a vein of a finger of a user being a registration target (hereinafter, the mode is referred to as a blood-vessel registration mode, and the registration target user is referred to as a registrant) or a command COM2 for a mode for determining whether a user is a registrant or not (hereinafter referred to as an authentication mode) is input from the operating portion 11 into the control portion 10.

The control portion 10 determines a mode to be executed on the basis of the command COM1 or COM2, appropriately controls the imaging unit 12, the memory 13, the interface 14, and the notification portion 15 on the basis of a program corresponding to a result of the determination, and executes the blood-vessel registration mode or the authentication mode.

The imaging unit 12 illuminates a surface on which a finger can be placed (hereinafter referred to as a finger placement surface) with imaging light and outputs image data relating to an image containing a vein inside the finger placed on the finger placement surface (hereinafter referred to as a venous image) to the control portion 10.

The memory 13 can be a flash memory, for example, and stores or reads data specified by the control portion 10.

The interface 14 exchanges various kinds of data with an external device connected through a predetermined transmission line.

The notification portion 15 includes a display portion 15a and an audio output portion 15b. The display portion 15a displays text and graphics based on display data supplied from the control portion 10 on its display screen. On the other hand, the audio output portion 15b outputs, from a speaker, audio based on audio data supplied from the control portion 10.

(1-1) Blood-Vessel Registration Mode

Figure 2:
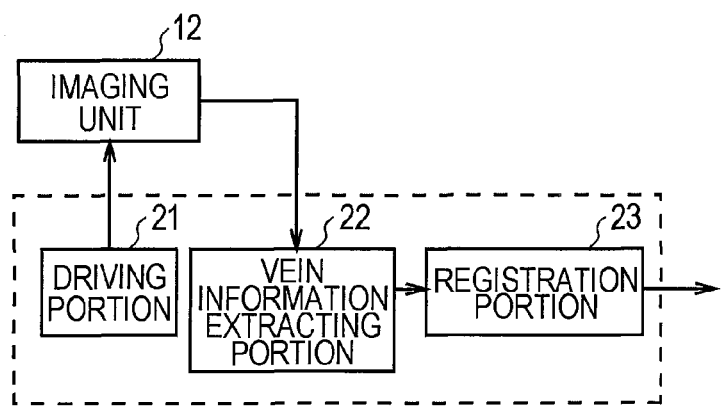
FIG. 2 is a block diagram that illustrates a functional configuration of a control portion in a blood-vessel registration mode.

Next, the blood-vessel registration mode is described. When determining the blood-vessel registration mode as the mode to be executed, the control portion 10 notifies that a finger should be placed on the finger placement surface through the notification portion 15, and after that, as illustrated in FIG. 2, the control portion 10 functions as a driving portion 21, a vein-information extracting portion 22, and a registration portion 23.

In this case, the driving portion 21 generates a predetermined control signal and drives the imaging unit 12 in accordance with the control signal.

The vein-information extracting portion 22 extracts information relating to a vein shown in a venous image (hereinafter referred to as vein information) on the basis of image data supplied from the imaging unit 12. As this vein information, various elements, for example, a venous image from which the center of a blood-vessel width or the peak of luminance is extracted, all or part of the center of the blood-vessel width or the peak of luminance, or a parameter subjected to curve fitting to a blood vessel can be employed.

The registration portion 23 acquires vein information extracted by the vein-information extracting portion 22 and registers it by storing it as registration data into the memory 13.

In such a way, the control portion 10 can execute the blood-vessel registration mode.

(1-2) Authentication Mode

Figure 3:
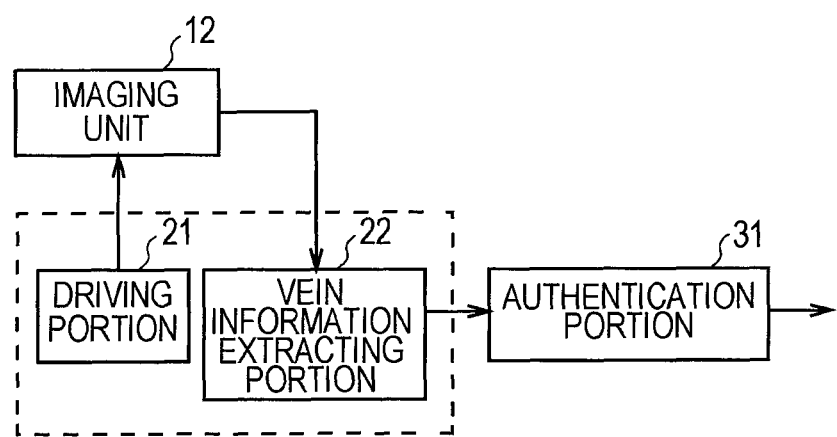
FIG. 3 is a block diagram that illustrates a functional configuration of the control portion in an authentication mode.

Next, the authentication mode is described. When determining the authentication mode as the mode to be executed, the control portion 10 notifies that a finger should be placed on the finger placement surface through the notification portion 15, and after that, as illustrated in FIG. 3, in which like parts are identified by the same reference numerals as in FIG. 2, the control portion 10 functions as the driving portion 21, the finger placement surface 22, and an authentication portion 31.

In this case, the driving portion 21 drives the imaging unit 12, and the finger placement surface 22 extracts vein information on the basis of image data supplied from the imaging unit 12.

The authentication portion 31 checks the vein information extracted by the finger placement surface 22 against the vein information registered as registration data in the memory 13.

And, when the degree of correlation of the vein information obtained as a result of this checking is less than a predetermined level, the authentication portion 31 determines that the person cannot be authenticated as a registrant. In this case, the authentication portion 31 visually and aurally notifies that the person cannot be authenticated as a registrant through the display portion 15a and the audio output portion 15b.

On the other hand, when the degree of correlation of the vein information obtained as a result of the checking is greater than or equal to the predetermined level, the authentication portion 31 determines that the person can be authenticated as a registrant. In this case, the authentication portion 31 sends data for starting execution of predetermined processing to a device connected to the interface 14. This device performs processing to be executed for successful authentication, as the predetermined processing, for example, closing a door in a fixed period of time or clearing an operational mode of a restriction target.

In such a way, this control portion 10 can execute the authentication mode.

(2) Configuration of Imaging Unit

Next, the imaging unit 12 is described. The imaging unit 12 is a unit that can also be incorporated into a portable device, such as a cellular phone.

Figure 4:
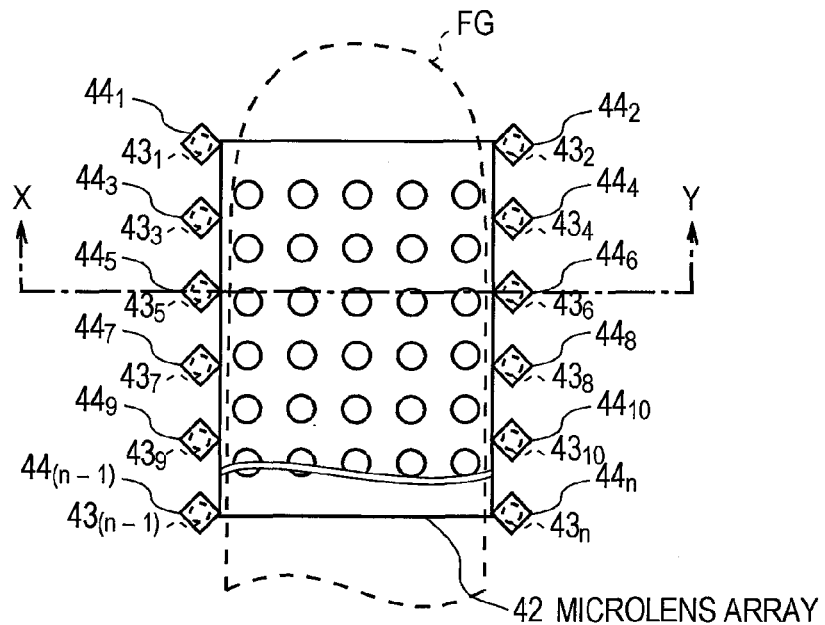
FIG. 4 is a schematic diagram that illustrates a configuration of an imaging unit.
Figure 4:
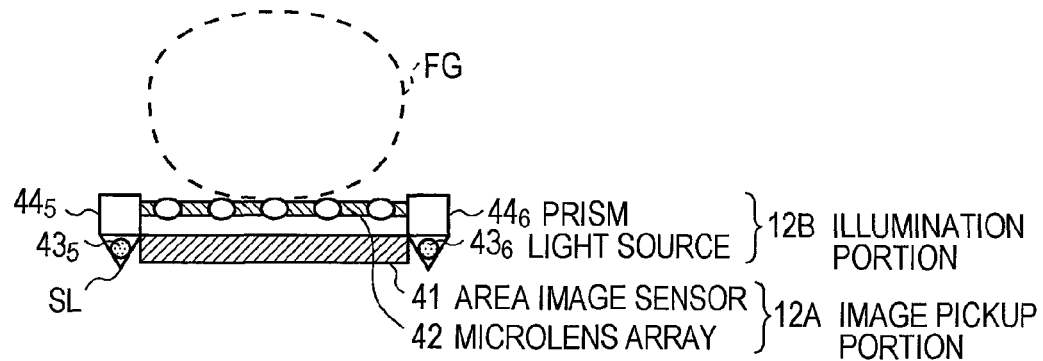

An example of the configuration of the imaging unit 12 is described using FIG. 4(A) and FIG. 4(B), which illustrates the X-Y cross section of FIG. 4(A). For this example of FIG. 4, the imaging unit 12 includes an imaging portion 12A containing an area image sensor 41 and a microlens array 42 and an illuminating portion 12B containing a plurality of light sources $43_1$ to $43_n$ and a plurality of prisms $44_1$ to $44_n$.

The area image sensor 41 includes an imaging element having an imaging surface in which a plurality of light receiving elements are arranged in a grid-like fashion. The area image sensor 41 is controlled by the driving portion 21 (FIG. 2, FIG. 3) so as to sequentially perform imaging for each light receiving element on a scan line. The imaging surface of this area image sensor 41 is arranged at a location spaced away by a predetermined distance from the back side of the finger placement surface so as to be opposed thereto.

The microlens array 42 includes a plate member having objective lenses arranged in a grid-like fashion, and each of the objective lenses guides light incident from its light incident surface to the imaging surface of the area image sensor 41. In this present embodiment, a surface of the microlens array 42 that is adjacent to the light incident surface of the objective lens is the finger placement surface.

In the case of this present embodiment, the surface of the microlens array 42 that is adjacent to the light incident surface of the objective lens is the finger placement surface. In this case, when a finger is placed on the finger placement surface, ambient light (light in atmosphere, such as visible light) other than light obtained through the inside of the finger from the light source (near-infrared light) does not substantially enter the light incident surface covered with the surface of the finger. Accordingly, the microlens array 42 can guide near-infrared light that contains a small noise component resulting from the ambient light to the imaging surface of the area image sensor 41.

The light sources $43_1$ to $43_n$ and the prisms $44_1$ to $44_n$ are disposed on the same direction as the side at which the area image sensor 41 is disposed with respect to a vein plexus inside a finger placed on the finger placement surface (light input surface).

In this example of FIG. 4, as is clear from FIG. 4(B), the light sources $43_1$ to $43_n$ and the prisms $44_1$ to $44_n$ are disposed in, of a first area adjacent to the finger placement surface and a second area opposite to the finger placement surface, the first and second areas being divided with reference to a vein plexus inside a finger placed on the finger placement surface (light input surface), the first area, where the area image sensor 41 is disposed.

Among the light sources $43_1$ to $43_n$ and the prisms $44_1$ to $44_n$, two of them serving as one set are arranged along the longitudinal direction of the finger placed on the finger placement surface (light input surface) so as to sandwich the finger placement surface (light input surface).

Each of the light sources $43_1$ to $43_n$ outputs near-infrared light having a wavelength contained in a wavelength band (700 [nm] to 900 [nm]) having a characteristic of being specifically absorbed in both deoxygenated hemoglobin and oxygenated hemoglobin. These light sources $43_1$ to $43_n$ are covered with a blocking member SL covering a section other than a section where the prisms $44_1$ to $44_n$ are disposed.

On the other hand, the prisms $44_1$ to $44_n$ illuminates a section behind a vein plexus inside a finger when the finger is placed on the finger placement surface and above the finger placement surface (light input surface) with near-infrared light output from the corresponding light sources $43_1$ to $43_n$ through the blocking member SL.

The vein plexus is contained in the intermediate layer (dermal layer) of a three-layer structure (epidermal layer, dermal layer, subcutaneous tissue layer). The dermal layer has a thickness of 2 to 3 [mm] from a location of 0.1 to 0.3 [mm] from the surface of a finger. From this, if a section spaced away from the finger placement surface by approximately 3.5 [mm] or more in its horizontal direction is an illumination target, the subcutaneous tissue layer being above the dermal layer when a finger is placed on the finger placement surface (light input surface), that is, a section behind the vein plexus can be illuminated with near-infrared light.

Figure 5:
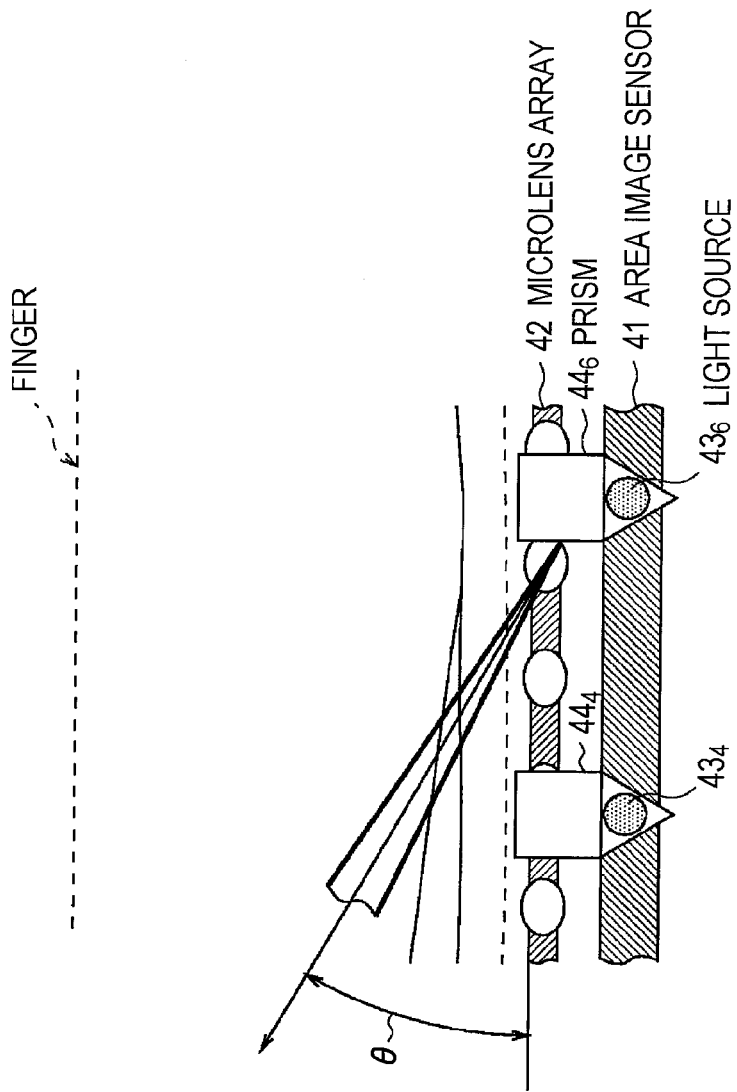
FIG. 5 is a schematic diagram that illustrates a relationship between an illumination direction and a finger placement surface.

Specifically, as illustrated in FIG. 5, for example, the prisms $44_1$ to $44_n$ are configured such that a section behind the vein plexus is illuminated with light from a direction having an angle θ with respect to the finger placement surface (light input surface). This angle θ is set at any angle in the range of 30[°] to 60[°]. Incidentally, for the sake of convenience, FIG. 5 illustrates only an incident angle of near-infrared light emitted from the light source $43_6$ through the corresponding prism $44_6$.

Accordingly, for the imaging unit 12, when a section behind the vein plexus inside a finger placed on the finger placement surface (light input surface) is illuminated with near-infrared light, the near-infrared light enters the inside of the finger, travels through the vein plexus and epidermal layer by reflection and scattering inside the finger, and enters the light input surface of the microlens array 42. At this time, a non-vein section inside the finger is in a light state, whereas a vein section is maintained in a dark state because of absorption properties of hemoglobin, and the contrast between the vein section and the non-vein section is sharp, so the near-infrared light entering the light input surface is guided as light for projecting a vein (hereinafter referred to as vein projection light) to the imaging surface of the area image sensor 41.

In such a way, this imaging unit 12 can make vein projection light achieving a sharp contract between a vein section and a non-vein section enter the imaging portion 12A by illuminating a section behind a vein plexus inside a finger using the illuminating portion 12B, and therefore, a blood vessel inside a finger can be faithfully represented.

In addition to such a configuration, the illuminating portion 12B in this imaging unit 12 is configured such that not the whole of a space corresponding to a section behind a vein of a finger placed on the finger placement surface (light input surface) is set as an illumination target, but an illumination target for the space is assigned so as to correspond to one or more scan lines in the area image sensor 41.

Figure 6:
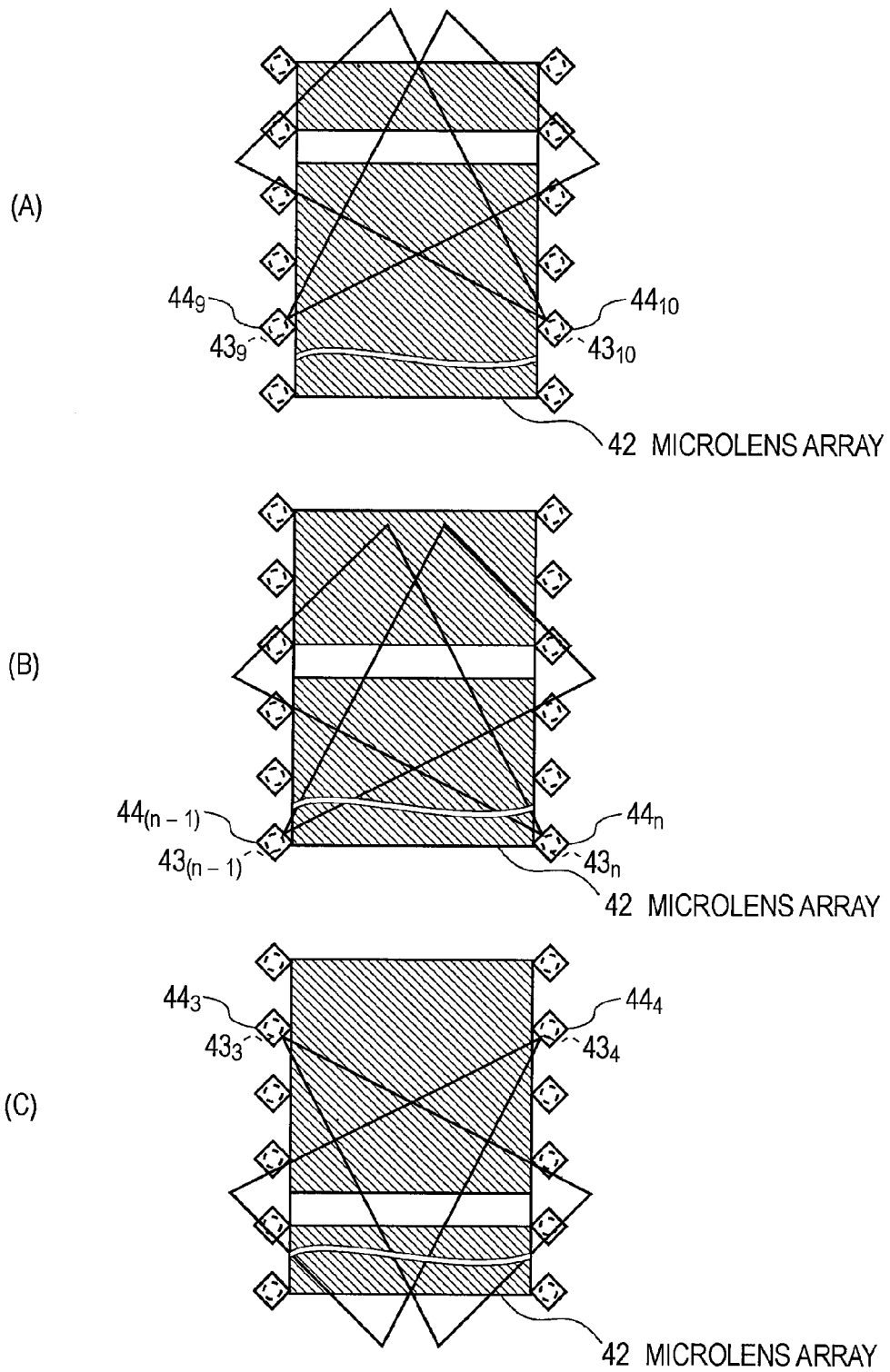
FIG. 6 is a schematic diagram for use in describing assignment of an illumination target to a region corresponding to a scan line.

In this present embodiment, as illustrated in FIG. 6, for example, the illumination direction, the location, and the like of a pair of the prisms $44_9$ and $44_{10}$ are selected such that, when a finger is placed on the finger placement surface (light input surface), the light sources $43_9$ and $43_{10}$ are assigned as an illumination target for a space region behind a vein being an image formation target to the scan lines of, for example, the 11th line to 15th line in the area image sensor 41.

Similarly, the illumination direction, the location, and the like of a pair of prisms $44_{(n-1)}$ and $44_n$ are selected such that the light sources $43_{(n-1)}$ and $43_n$ are assigned as an illumination target for a space region behind a vein being an image formation target to the scan lines of the 21st line to 25th line in the area image sensor 41, . . . , and the illumination direction, the position, and the like of a pair of prisms $44_3$ and $44_4$ are selected such that assignment as an illumination target for a space region behind a vein being an image formation target to the scan lines of the 35th line to 40th line in the area image sensor 41 is performed.

In such a way, for this example of FIG. 6, with respect to the illumination targets for the corresponding space regions $AR_1$ to $AR_M$ behind a vein plexus, to each of the space regions behind a vein being an image formation target to an imaging section (five scan lines) in the area image sensor 41, the illumination targets in the sets of the prisms $44_1$ and $44_2$, $44_3$ and $44_4$, . . . , and $44_{(n-1)}$ and $44_n$ and the light sources $43_1$ and $43_2$, $43_3$ and $43_4$, . . . , and $43_{(n-1)}$ and $43_n$ are assigned.

It is to be noted that, although in this example of FIG. 6 space regions and illumination targets in sets of prisms and light sources are in a one-to-one correspondence, any assignment technique, such as correlating one space region with a plurality of sets of prisms and light sources, can be used as long as illumination targets are assigned to corresponding space regions behind a vein being image formation targets to imaging sections.

(3) Drive Processing for Imaging Unit in Control Portion

On the other hand, the control portion 10 of this authentication apparatus 1 functions as the driving portion 21 in the blood-vessel registration mode or the authentication mode, and when the control portion 10 drives the imaging unit 12, it makes only part of the light sources $43_1$ to $43_n$ be lightened while operating together with a scan line being a scan target among the scan lines in the area image sensor 41.

Specifically, until a scan period in one or more scan lines elapses from a point a predetermined period before the beginning of that scan period, the driving portion 21 lightens only the light sources $43_1$ and $43_2$, 433 and 434, . . . , or $43_{(n-1)}$ and $43_n$ assigned to the space region $AR_1$, $AR_2$, . . . , or $AR_M$ behind a vein being an image formation target to the scan lines.

In the example of FIG. 6, when scanning the scan lines from the 21st line to 25th line, for example, the driving portion 21 lightens only the light sources $43_{(n-1)}$ and $43_n$ assigned to the space region behind a vein being an image formation target to the scan lines until the end of the scan period of the 25th line from a point a predetermined period before the beginning of the scan period of the 21st line.

Figure 7:
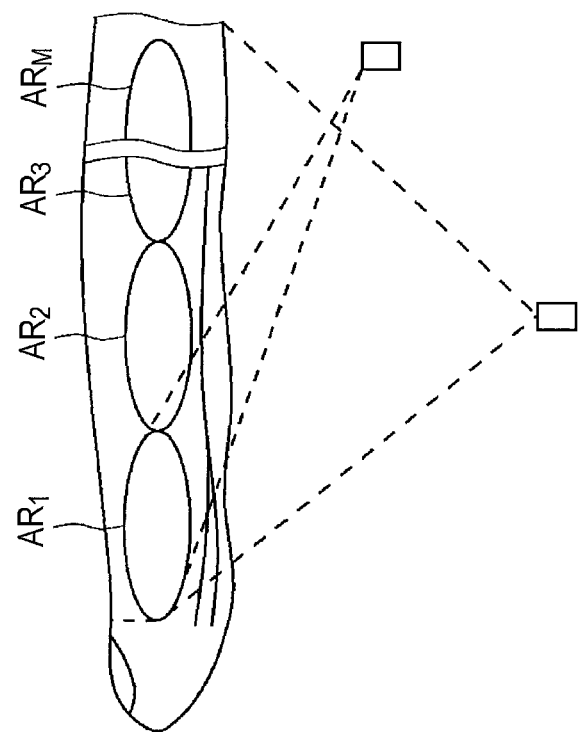
FIG. 7 is a schematic diagram for use in describing a distance between the location of the finger placement surface and the location of an illuminating portion for total illumination and for partial illumination.

In this case, as is clear from FIG. 7, near-infrared light emitted from the light sources $43_{(n-1)}$ and $43_n$ passes through the space regions $AR_2$ to $AR_M$ behind a vein being image formation targets to scan lines subsequent to the 25th line being a non-scan target and enters the inside of a finger obliquely with respect to the surface of the finger toward behind a vein being an image formation target to a scan line being the current scan target.

And, the near-infrared light entering the inside of the finger travels through the vein plexus and the epidermal layer by reflection and scattering inside the finger and enters the scan lines from the 21st line to the 25th line in the area image sensor 41 from the surface of the finger through the microlens array 42 as vein projection light, so only the vein section being the current imaging target in the vein plexus inside the finger placed on the finger placement surface is subjected to image formation.

In such a way, it is possible for this imaging unit 12 to use the space regions $AR_2$ to $AR_M$ corresponding to a non-imaging section as an illumination light path for the space region $AR_1$ corresponding to the current imaging section. Accordingly, this imaging unit 12 can bring the illuminating portion 12B closer to the finger placement surface (light input surface), as compared with the case where the whole of the space regions $AR_1$ to $AR_M$ is an illumination target, so size reduction can be made.

And, as compared with the case where the light sources $43_1$ to $43_n$ are lightened at the same time, this imaging unit 12 can more reduce unnecessary power consumption, and additionally, significantly reduce the occurrence of events where vein projection light in the space regions $AR_2$ to $AR_M$ other than the space region $AR_1$ is mixed into vein projection light in the space region $AR_1$ being a scan target. Therefore, a blood vessel inside a living body (finger) can be faithfully represented.

(4) Operation and Effect

In the above configuration, this authentication apparatus 1 assigns an illumination target for a space region corresponding to a section behind a vein of a finger placed on the finger placement surface (light input surface) such that the illumination target corresponds to one or more scan lines in the area image sensor 41 (FIG. 6).

Then, this authentication apparatus 1 drives the light sources $43_1$ and $43_2$, $43_3$ and $43_4$, . . . , or $43_{(n-1)}$ and $43_n$ assigned to the corresponding space region $AR_1$, $AR_2$, . . . , or $AR_M$ corresponding to a scan line until a scan period of the scan line elapses from a point a predetermined period before the beginning of the scan period for the scan line (FIG. 5, FIG. 7).

Owing to this, this authentication apparatus 1 can individually perform imaging on a vein inside a finger for each vein section corresponding to the space region $AR_1$, $AR_2$, . . . , or $AR_M$ corresponding to the scan line.

And, this authentication apparatus 1 can use a space region corresponding to a non-imaging section, which is not a scan target, as an illumination light path for a space region corresponding to an imaging section being the current scan target, that is, can share the illumination light path in each of the light sources $43_1$ to $43_n$ within a space between the light sources $43_1$ to $43_n$ and the finger placement surface, so the illuminating portion 12B can be brought closer to the finger placement surface (light input surface), as compared with the case where the whole of the space regions $AR_1$ to $AR_M$ is an illumination target, and size reduction can be made.

And, for this authentication apparatus 1, the illumination direction of each of the light sources $43_1$ and $43_2$, $43_3$ and $43_4$, . . . , and $43_{(n-1)}$ and $43_n$ is set such that the angle θ formed with the finger placement surface is any angle in the range from 30[°] to 60[°] (FIG. 6).

Owing to this, this authentication apparatus 1 can have a small incident angle of near-infrared light from each of the light sources $43_1$ to $43_n$ with respect to a finger placed on the finger placement surface, so reflected light from the surface of the finger can be more reduced, as compared with the case where near-infrared light is emitted from a direction opposite to the surface of the finger by 180[°]. Therefore, a blood vessel inside a finger can be more faithfully represented.

With the above configuration, of the finger placement surface, only the space region $AR_1$, $AR_2$, . . . , or $AR_M$ corresponding to a scan line is individually illuminated with imaging light, and, of blood vessels inside a finger placed on the finger placement surface, blood vessels projected on the imaging surface can be read for each of the blood vessels corresponding to the scan line when it becomes a scan target. This can make a good image quality of the whole of the area image sensor 41. Hence, the authentication apparatus 1 capable of expanding a range for use in acquiring a good-quality image can be achieved.

(5) Other Embodiments

In the above-described embodiment, the case is described where the illuminating portion 12B is constructed of the plurality of prisms $44_1$ to $44_n$ and the plurality of light sources $43_1$ to $43_n$. However, the present invention is not limited to this case. Other various configurations can be employed as long as an illumination target is assigned to each of the space regions $AR_1$ to $AR_M$ corresponding to an imaging section in an imaging element.

For example, moving members allowing rotation movement or translation movement can be disposed so as to sandwich the finger placement surface (light input surface) such that each of the moving members is provided with one light source. On the other hand, the driving portion 21 can move the moving members operating together with an imaging section in the imaging element such that an illumination target for the light source provided to each of the moving members is the space region $AR_1$, $AR_2$, . . . , or $AR_M$ corresponding to an imaging section. With this, the plurality of prisms $44_1$ to $44_n$ can be omitted, so the size can be further reduced.

And, in the case where a configuration of having the plurality of prisms $44_1$ to $44_n$ and the plurality of light sources $43_1$ to $43_n$ is used, the arrangement and the like are not limited to the case illustrated in FIG. 4. Other various arrangements and the like can be employed as long as an illumination target is assigned to each of the space regions $AR_1$ to $AR_M$ corresponding to imaging sections in an imaging element.

And, in the above-described embodiment, the case is described where one prism is individually provided to one light source. However, the present invention is not intended to enforce a one-to-one correspondence on the correspondence relationship between the light sources and prisms, for example, one prism can be provided to a plurality of light sources.

Additionally, in the above-described embodiment, the case is described where an angle between the illumination direction of a prism and the finger placement surface is set at any angle in the range from 30[°] to 60[°]. However, the present invention is not limited to this case, and other angle can be set. Specifically, it may preferably be in the range from 30[°] to 45[°]. If it is at least an obtuse angle, surface reflection light can be reduced.

Additionally, in the above-described embodiment, the case is described where a light source that emits light having a wavelength contained in a wavelength band having a characteristic of being specifically absorbed in both deoxygenated hemoglobin and oxygenated hemoglobin is used. However, the present invention is not limited to this case. A light source that emits light having the other wavelength may also be used, depending to imaging environment.

Figure 8:
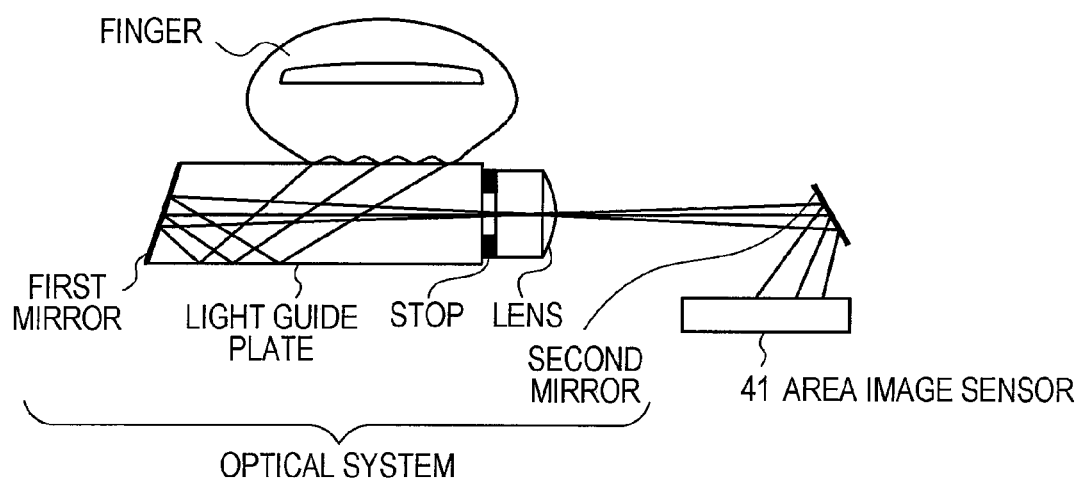
FIG. 8 is a schematic diagram that illustrates an optical system according to another embodiment.

Additionally, in the above-described embodiment, the case is described where the microlens array 41 is used as an optical system. However, the present invention is not limited to this case. For example, as illustrated in FIG. 8, an optical system that bends light incident from the finger placement surface and guides it into the area image sensor 41 may also be used. It is to be noted that an optical system other than this bending-type optical system or the microlens array 41 can be employed as appropriate as long as it is an optical system that guides light into the area image sensor 41.

Additionally, in the above-described embodiment, the case is described where a two-dimensional imaging element (area image sensor 41) is used. However, the present invention is not limited to this case. A one-dimensional imaging element (line image sensor) movable in parallel with the finger placement surface may also be used.

Additionally, in the above-described embodiment, the case is described where the authentication apparatus 1 having the imaging function, checking function, and registration function is used. However, the present invention is not limited to this case. A mode in which each function or part of the functions is allocated to a single device depending on the application may also be used.

INDUSTRIAL APPLICABILITY

The present invention can be utilized in the field of biometrics authentication.

The invention claimed is:

1. A vein authentication apparatus, comprising:
an area image sensor including a first imaging section performing imaging in a first time period and a second imaging section performing imaging in a second time period, the first and the second imaging sections imaging light reflected from a vein plexus inside a finger and light transmitted through the vein plexus;
an illumination source located on the same side of the vein plexus as the area image sensor, the illumination source including light sources configured to emit near-infrared light; and
a controller, which:
activates a first portion of the light sources such that the near-infrared light emitted from the first portion is:
permitted to enter a gap between the second imaging section and the vein plexus; and
scattered behind a first vein section corresponding to the first imaging section during the first time period;
activates a second portion of the light sources such that the near-infrared light emitted from the second portion is:
permitted to enter a gap between the first imaging section and the vein plexus; and
scattered behind a second vein section corresponding to the second imaging section during the second time period; and
performs authentication on the basis of an image obtained by the area image sensor and stored vein information.

2. The vein authentication apparatus according to claim 1, wherein the area image sensor includes at least a third imaging section.

3. The vein authentication apparatus according to claim 2, wherein:
when the controller activates the first portion, the controller turns off the second portion and all light sources other than the first portion, and
when the controller activates the second portion, the controller turns off the first portion and all light sources other than the second portion.

4. The vein authentication apparatus according to claim 3, wherein
the illumination source is configured such that an angle of a section for emitting near-infrared light varies, and
the controller is configured to make the angle of the section vary such that the near-infrared light emitted from the illumination source is scattered behind the vein section corresponding to the imaging section being in the imaging period among the plurality of imaging sections.

5. The vein authenticating apparatus according to claim 1, further including a plurality of prisms.

6. The vein authenticating apparatus according to claim 5, further including a microlens array.

7. The vein authenticating apparatus according to claim 6, wherein the microlens array further includes:
 a plate member; and
 a plurality of objective lenses attached to the plate member in a first grid.

8. The vein authenticating apparatus according to claim 7, wherein the array image sensor further includes a plurality of light receiving elements arranged in a second grid.

9. The vein authenticating apparatus according to claim 8, wherein the second grid is located below the first grid and aligned with the first grid.

10. An imaging apparatus for vein authentication, comprising:
 an area image sensor including a first imaging section performing imaging in a first time period and a second imaging section performing imaging in a second time period, the first and the second imaging sections imaging light reflected from a vein plexus inside a finger and light transmitted through the vein plexus;
 an illumination source located on the same side of the vein plexus as the area image sensor, the illumination source including light sources configured to emit near-infrared light; and
 a controller which:
  activates a first portion of the light sources such that the near-infrared light emitted from the first portion is:
   permitted to enter a gap between the second imaging section and the vein plexus; and
   scattered behind a first vein section corresponding to the first imaging section during the first time period; and
  activates a second portion of the light sources such that the near-infrared light emitted from the second portion is:
   permitted to enter a gap between the first imaging section and the vein plexus; and
   scattered behind a second vein section corresponding to the second imaging section during the second time period.

11. A method of vein authentication comprising:
 emitting near-infrared light using an illumination source;
 illuminating a vein plexus inside a finger using the illumination source;
 directing light reflected from the vein plexus and light transmitted through the vein plexus to an area image sensor, the image sensor including a first imaging section and a second imaging section;
 activating a first portion of the illumination source such that the near-infrared light emitted from the first portion is:
  permitted to enter a gap between the second imaging section and the vein plexus; and
  scattered behind a first vein section corresponding to the first imaging section during a first time period; and
 activating a second portion of the illumination source such that the near-infrared light emitted from the second portion is:
  permitted to enter a gap between the first imaging section and the vein plexus; and
  scattered behind a second vein section corresponding to the second imaging section during a second time period.

12. The method of claim 11, wherein:
illuminating the first portion includes turning off the second portion; and
illuminating the second portion includes turning off the first portion.

\* \* \* \* \*

UNITED STATES PATENT AND TRADEMARK OFFICE
CERTIFICATE OF CORRECTION

PATENT NO.         : 8,649,568 B2
APPLICATION NO.    : 12/668973
DATED              : February 11, 2014
INVENTOR(S)        : Hideo Sato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twenty-ninth Day of September, 2015

Michelle K. Lee
*Director of the United States Patent and Trademark Office*